Patented Feb. 19, 1935

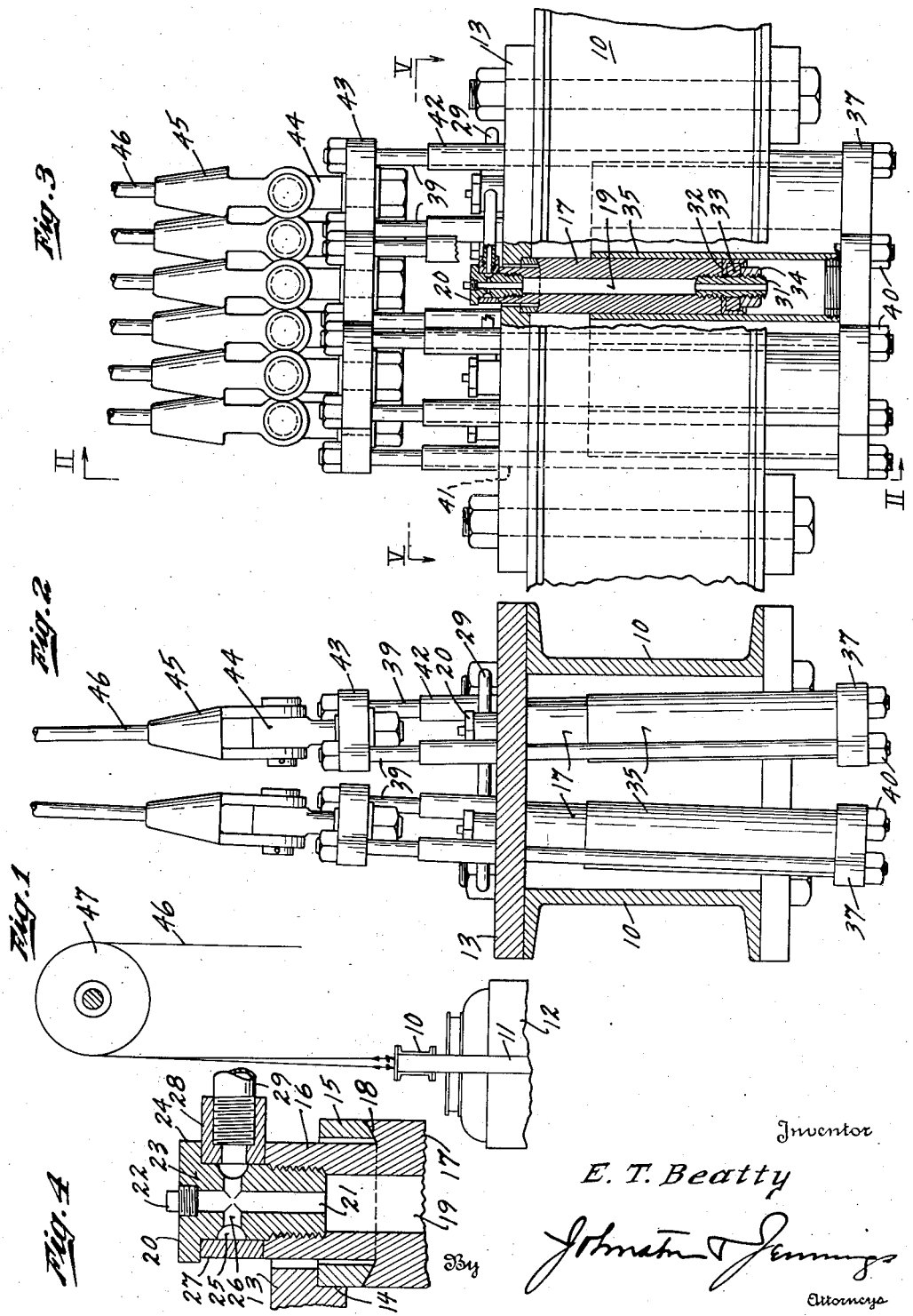
Feb. 19, 1935.    E. T. BEATTY    1,991,538
HYDRAULIC CABLE EQUALIZER
Filed May 28, 1934    2 Sheets-Sheet 1
Inventor
E. T. Beatty

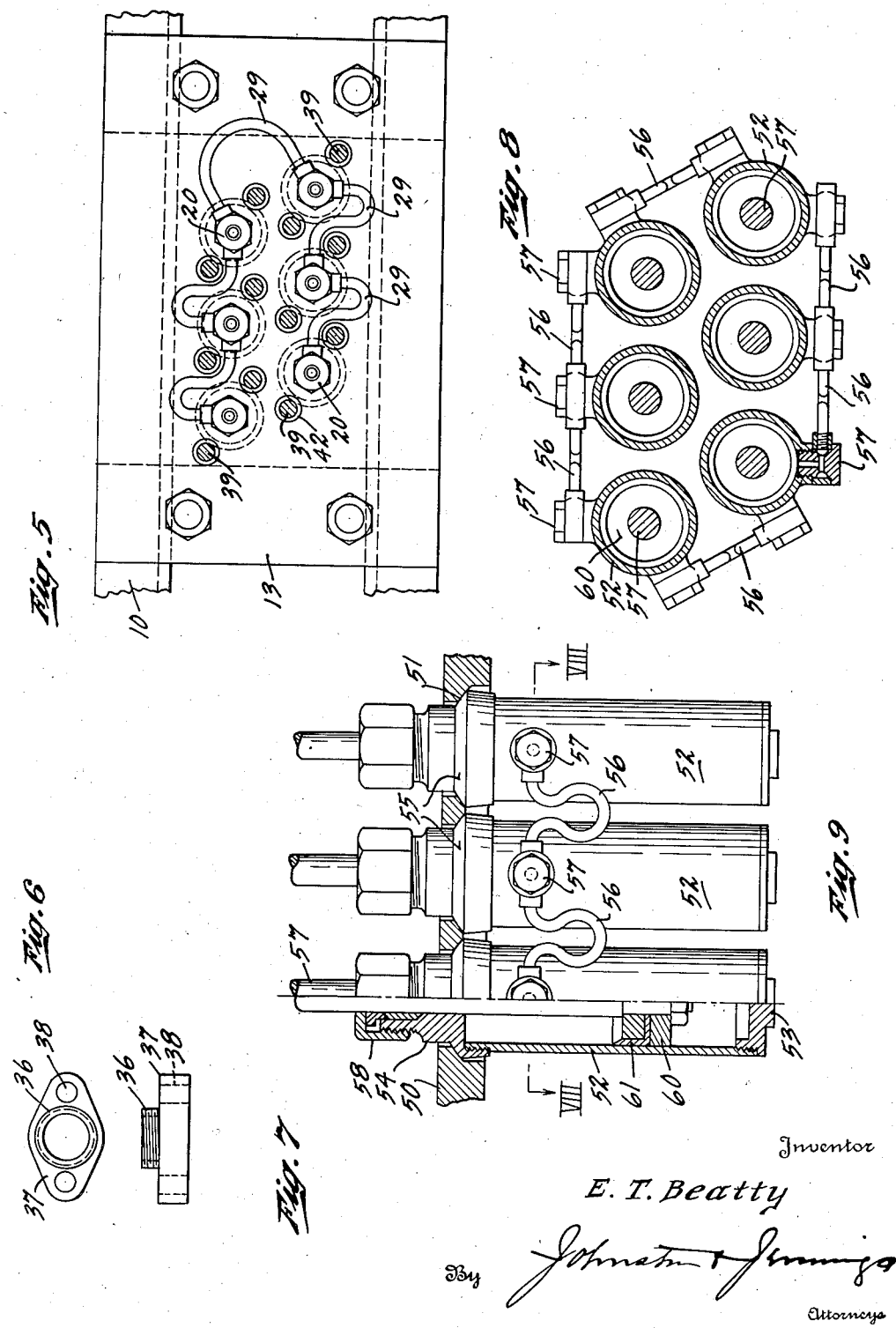

1,991,538

UNITED STATES PATENT OFFICE 1,991,538

HYDRAULIC CABLE EQUALIZER

Edward T. Beatty, Birmingham, Ala.

Application May 28, 1934, Serial No. 727,901

8 Claims. (Cl. 187—1)

My invention relates to a hydraulic mechanism for equalizing the load, wear and duty upon the cables of a suspension means for any element, such as an elevator.

Though my invention is adapted to various uses, its more important service is in connection with elevator suspensions wherein it is of critical importance that the head room requirements be held down to a minimum, and at the same time that the off-lead of the cables from the overhead drum, for good practice, be held within a range not exceeding one-fourth of an inch of off-lead per foot of minimum head room.

It being a desideratum that the equalizing means shall itself be as compact, and require as little head room, as possible, I have designed an hydraulic equalizer which is characterized by the provision of a universal joint between the load bearing members of the several suspension cables and the support from which the elevator is hung. The term "elevator" as hereinafter used is inclusive of any weight or load element.

My invention further contemplates a novel, simple and effective arrangement of universal bearing seats in a supporting plate for the elevator, each adapted to receive a complemental bearing member on the head of an angularly movable cylinder having its reciprocable plunger connected to the cable, or on the plunger which is angularly movable and coacts with a reciprocable cylinder connected to the cable which it respectively controls.

It is a distinct advantage of my invention that by providing a universal joint mounting for each cable connection I cause all of the cables and their connections to work at all times in the true line of pull on the cables, and thus any side stress on the moving parts of the equalizer is avoided.

My invention further contemplates that the hydraulic elements shall be so coupled up as to permit of the independent play on each cable supporting element to compensate for difference in cable lengths or for unequal or differential wear in the overhead pulley grooves which would otherwise impose upon a cable a slippage equal to the extent of the excess wear of its groove relative to the other grooves of the pulley.

My invention further contemplates connecting the flexible pressure equalizing tubes, which couple the hydraulic cylinders to a movable element at or near the center from which the universal bearing seat is struck so that the rocking of the cylinders will produce only negligble stress or flexing upon the tubes. Where the cylinder engages the universal seat, the point of tube connection can be below the seat plate thus reducing headroom and affording better production for the tubes.

My invention further comprises the novel details of construction and arrangements of parts which are hereinafter more particularly described and claimed and which are shown in two embodiments in the accompanying drawings which form a part of this specification, and in which:—

Fig. 1 is a side view of an elevator suspension showing the cab broken away;

Fig. 2 is a section taken on the line II—II of Fig. 3;

Fig. 3 is a front elevation in detail of the equalizer mechanism with one cylinder broken away in vertical central cross section;

Fig. 4 is an enlarged detail view in vertical cross section of the plunger neck and its ball joint seat;

Fig. 5 is a sectional view on the line V—V of Fig. 3;

Fig. 6 is a detail plan view, and Fig. 7 a side elevation of the lower head for an equalizing cylinder;

Fig. 8 is a cross sectional view taken on the line VIII—VIII of Fig. 9, showing a modification of my invention wherein the plungers are reciprocable and the cylinders rock in universal bearings; and Fig. 9 is a side elevation of the modified type of my invention showing one cylinder broken away in vertical half section.

Similar reference numerals refer to similar parts throughout the drawings.

In the embodiment of my invention illustrated in Figs. 1 to 7, I show the cross head composed of outturned channels 10 suitably connected to the supporting frame work 11 for the elevator 12. These channels have bolted to them overhead a plate 13 having machined in its under face a plurality of countersunk seats 14 for ball joint bearings 15 with central openings registering in the bearing and seat to permit the free passage therethrough of the top neck 16 on a plunger 17. This plunger has surrounding the lower end of its neck a seat 18 having its upper face machined to be complemental to the bearing 15. The necks of the several plungers fit loosely in the openings in bearings 15 and seats 14 so that the plungers may have the requisite maximum angular play contemplated without binding at any point against the plate 13.

Each plunger is drilled to form a longitudinal bore 19 extending entirely therethrough with its upper end enlarged and threaded to receive the threaded shank of a special connection 20.

I bore an axial hole 21 through this connection which is closed at its upper end by the screw plug 22, thus providing a filling opening for each cylinder.

The connection 20 comprises a cylindrical body 23 having top shoulder 24, and a circumferential groove 25 cut around its central portion with one or more radial ports 26 connecting it with the bore 21. A sleeve 27 fitting snugly about the body 23 is adapted to be jammed between the shoulder 24 and the top of the neck 16 of the plunger, thus establishing a tight joint. This sleeve has either a single boss 28, or a pair of bosses 28, according to its position in the equalizer assembly, and each boss has a threaded hole therethrough, communicating with the groove 25, into which is screwed one end of an arched yieldable connection 29 leading to an adjacent cylinder.

A nipple 31, axially bored, and externally threaded, is screwed into the lower end of the plunger bore 19, and a cup leather 32 backed by a washer 33 is held in place by a nut 34 screwed on the nipple.

Each plunger, as thus described, is received and slidably mounted within a cylinder 35, the lower end of which is internally threaded and screwed on to a boss 36 integral with a bottom cylinder head 37 having opposed ears vertically bored at 38 in juxtaposition to the outside cylinder wall to permit a pair of suspension rods 39 to pass along each side of the cylinder and through the head 37 to which they are connected by means of the nuts 40.

These rods, at their upper ends, pass freely through holes 41 formed in the top plate 13, and each receives a loose sleeve 42 resting on the top plate. The rods project above the sleeves having their upper ends reduced and threaded, each pair of rods being connected rigidly by nuts to a hanger bar 43 swiveled on a connection 44 associated with a conventional shackle 45. Each shackle thus, through its hanger bar 43 and the pair of rods 39 suspended therefrom is connected to a lower cylinder head 37, and acts through a fluid body interposed between it and the plunger to provide an hydraulic support for the suspended weight.

The mechanism thus far described serves as a single cable connection, and a duplicate thereof will be provided for each cable, it being observed by reference to Fig. 5 that the suspension rods are set in a plane diagonal to the transverse line of cylinders, thus enabling the cylinders to be set on closer centers and the ears 38 to overlap, as viewed in front elevation.

This arrangement also permits the elements of each transverse row of cylinders to be brought very closely together without causing the ears 38 of adjacent cylinders to engage, and I am able to bring the assembly of equalizing cylinders into very close relationship.

The tubes 29 connecting the cylinders in each transverse row are similar, and a connection is provided between the end cylinders of the two transverse rows so as to bring all cylinders in the equalizer mechanism into communication.

The hanger bars 43 stand spaced above the sleeves 42 about the same distance that the nipples 31 are spaced from the lower cylinder heads. This spacing provides ample clearance to permit each cylinder to have the requisite vertical play relative to its plunger to perform its equalizing function between the nipple 31 and the top plate 13.

The upper end of the cylinders are all left open, no glands or stuffing boxes being necessary, and there is only one packing required for each cylinder, namely, the cup leather 33.

Having assembled the equalizer elements, say for a six cable suspension, in the manner described, and having connected each shackle 45 to its respective cable 46, and having filled the several cylinders with oil or other fluid through their filling ports 21, the equalizer is ready for service and its operation may be briefly described as follows:

The load of the elevator acting through plate 13 supports the elevator on the ball joints between the plungers 17 and the seats 18, leaving each plunger free to have a universal movement which will enable its cylinder to set itself in perfect alignment with the pull on its respective cable 46 and shackle connections 44 and 45. If now there be unequal stretch in the cables, or if they are initially of unequal length, or if by reason of improper manufacture or uneven wear the circumference of the grooves in the overhead pulley 47 for the several cables become unequal, it will be necessary for the equalizing function to come into play and this will take place by the cylinder or cylinders 35 connected to the longer cable or cables giving down and the cylinder or cylinders connected to the other cable or cables being correspondingly raised so that the load is equalized on each cable, and this equalization is maintained notwithstanding any inequality in cable groove dimensions by the vertical play of the cylinder connected to the cable working in the off size groove whereby the cylinder will rise or fall to compensate the different lineal travel of the cable in the groove without imposing slippage or wear on the drum.

It will be observed that in my particular design the cylinders can be brought very closely together both laterally and transversely, and that it is permissible to use my suspension with an off lead very materially less than the minimum requirements of a quarter of an inch per foot of minimum headroom.

Oil or any desirable liquid may be used in the cylinders, and any fluid medium whether compressible or not may be substituted, but it will be necessary to put the compressible medium under the requisite initial pressure to bear the dead weight load and the normal live load.

The universal joint seats for the angularly movable element are nearly concentric with the equalizing tube connections, the centers being above the load bearing plate 10 (Fig. 3) and below the load bearing plate 50 (Fig. 9), and thus I reduce to a minimum strains on the equalizer tube connections. While ball joints are shown, any universal joint assembly may be substituted.

Though I show each cylinder and piston assembly connected to a single cable, it is to be understood that it may be connected, in the manner well understood in this art, to any desired number of cables.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. A cable suspension equalizer comprising a plurality of cylinder and piston assemblies, means to connect supporting cables to corresponding elements of said assemblies, means to suspend the load by universal joints from the other elements of said assemblies, means to interpose a fluid medium between the elements of each assembly, and means to equalize the pressure of said medium in the cylinders.

2. A cable suspension according to claim 1, in which the pressure equalizing means comprises by-pass pipes connected to the assembly elements adjacent to the center about which they have play on their respective universal joints.

3. In an equalizer means for a multiple cable load suspension, a plurality of pistons and cylinders therefor, a load support having universal joint connections to said cylinders, cables connected to said pistons, a fluid medium between each piston and cylinder, and means to equalize the pressure of said fluid mediums in the several cylinders.

4. In an equalizer means for a multiple cable load suspension, a plurality of pistons and cylinders therefor, a load support having universal joint connections to said cylinders, cables connected to said pistons, a fluid medium between each piston and cylinder, and means to equalize the pressure of said fluid mediums in the several cylinders, said equalizing means comprising pipes connected to the several cylinders in line with and adjacent to the center of their respective universal joints.

5. In an equalizing means for a multiple cable suspension, a plurality of tubular pistons closed at their upper ends, cylinders in which said pistons work, a load support having universal joint connections to said pistons, cables connected overhead to said cylinders, a fluid medium interposed between each piston and its cylinder, an equalizer means establishing communication between said fluid mediums in the several cylinders through said pistons and through pipes connected to the pistons at or near the center of their respective universal joints.

6. In an equalizer for a multiple cable load suspension, a plurality of pistons and cylinders therefor, a load support having universal joint connections to said pistons, cables connected to said cylinders, a fluid medium under compression between each piston and its respective cylinder, and means to equalize the pressure of said fluid mediums in the several cylinders.

7. In an equalizer for a multiple cable load suspension, a plurality of pistons and cylinders therefor, a load support having universal joint connections to said pistons, cables connected to said cylinders, a fluid medium under compression between each piston and its respective cylinder, and means to equalize the pressure of said fluid mediums in the several cylinders comprising pipes in communication with the cylinders through the ports in their respective pistons and connected to the pistons near the center of their respective universal joints about which they have angular play.

8. A cable suspension equalizer comprising a plate connected to the load, cylinders having ball joint bearings between their upper ends and said plate, pistons in the cylinders projecting upwardly through said plates free for angular play, cables connected to said pistons, fluid bodies maintained between the pistons and upper ends of the cylinders, and equalizer pipes connecting the cylinders below said plate.

EDWARD T. BEATTY.